US010239251B2

(12) United States Patent
Deck et al.

(10) Patent No.: US 10,239,251 B2
(45) Date of Patent: Mar. 26, 2019

(54) APPARATUS AND METHOD OF FORMING A COMPOSITE STRUCTURE

(71) Applicant: The Boeing Company, Chicago, IL (US)

(72) Inventors: Eric Eldon Deck, St. Louis, MO (US); Steven J. Burpo, St. Charles, MO (US); Allyson Antonio, Florissant, MO (US); David John Sundquist, St. Peters, MO (US); Trevor Lee Howard, St. Louis, MO (US); Zachary Benjamin Renwick, Joliet, IL (US)

(73) Assignee: The Boeing Company, Chicago, IL (US)

( * ) Notice: Subject to any disclaimer, the term of this patent is extended or adjusted under 35 U.S.C. 154(b) by 463 days.

(21) Appl. No.: 15/004,610

(22) Filed: Jan. 22, 2016

(65) Prior Publication Data

US 2017/0210054 A1 Jul. 27, 2017

(51) Int. Cl.
*B29C 53/06* (2006.01)
*B29C 53/02* (2006.01)
(Continued)

(52) U.S. Cl.
CPC ............ *B29C 53/06* (2013.01); *B29C 53/025* (2013.01); *B29C 53/04* (2013.01); *B29C 53/82* (2013.01);
(Continued)

(58) Field of Classification Search
CPC ......... B29C 53/06; B29C 53/08; B29C 53/82; B29C 53/84; B29C 53/025; B29L 2031/3076

See application file for complete search history.

(56) References Cited

U.S. PATENT DOCUMENTS 2,302,568 A * 11/1942 Pitt ........................... B42F 9/00
                                                                24/67.5
5,114,654 A *  5/1992 Hosoi ................... B29C 51/004
                                                                264/313
(Continued)

FOREIGN PATENT DOCUMENTS

DE           19922799 A1    11/2000
DE       102012010497 A1    12/2012
(Continued)

OTHER PUBLICATIONS

Great Britain Combined Search and Examination Report for related application GB1619825.1 dated May 19, 2017, 6 pp.
(Continued)

*Primary Examiner* — Anthony Calandra
*Assistant Examiner* — Jerzi H Moreno Hernandez
(74) *Attorney, Agent, or Firm* — Armstrong Teasdale LLP

(57) ABSTRACT

A drape forming apparatus for that includes a forming tool including an upper forming surface and a side forming surface extending from the upper forming surface. The forming tool receives a layer of composite material over the upper forming surface. The apparatus includes a flange forming device including an upper plate, a lower plate, and a receiving slot defined therebetween. The receiving slot receives a flange portion of the layer of composite material, and the flange forming device is translatable relative to the forming tool such that the flange portion of the layer of composite material is withdrawn from the receiving slot and draped over the side forming surface. The apparatus includes a pressurized bladder that extends over the forming tool and the upper plate. The pressurized bladder forces the flange portion against the side forming surface as the flange forming device translates relative to the forming tool.

15 Claims, 7 Drawing Sheets

(51) Int. Cl.
*B29C 53/04* (2006.01)
*B29C 53/82* (2006.01)
*B29C 53/84* (2006.01)
*B29L 31/30* (2006.01)

(52) U.S. Cl.
CPC ....... *B29C 53/84* (2013.01); *B29L 2031/3076* (2013.01)

(56) References Cited

U.S. PATENT DOCUMENTS

| | | | |
|---|---|---|---|
| 6,814,916 B2 | 11/2004 | Willden et al. | |
| 7,118,370 B2 | 10/2006 | Willden et al. | |
| 7,651,650 B2 | 1/2010 | Willden et al. | |
| 8,142,181 B2* | 3/2012 | Willden | B29C 43/12 264/292 |
| 8,236,222 B2 | 8/2012 | Henderson et al. | |
| 2004/0021247 A1 | 2/2004 | Habisreitinger et al. | |
| 2010/0263789 A1* | 10/2010 | Graber | B29B 11/16 156/228 |
| 2012/0312459 A1* | 12/2012 | De Mattia | B29C 53/04 156/212 |
| 2014/0103585 A1* | 4/2014 | Coxon | B29C 70/446 264/544 |
| 2015/0343699 A1* | 12/2015 | Rayama | B29C 51/262 425/388 |
| 2015/0352795 A1 | 12/2015 | Coxon et al. | |
| 2016/0023409 A1 | 1/2016 | Coxon et al. | |
| 2016/0200041 A1* | 7/2016 | Chergui | B29C 67/0011 72/342.94 |

FOREIGN PATENT DOCUMENTS

| | | |
|---|---|---|
| EP | 2875931 A1 | 5/2015 |
| GB | 881703 A | 11/1961 |
| JP | 2014051065 A * | 3/2014 |
| WO | 9964221 A1 | 12/1999 |
| WO | 2016174400 A1 | 11/2016 |

OTHER PUBLICATIONS

Anderson, Michael Robert et al.; "Systems and Methods for Drape Forming a Charge of Composite Material"; co-pending U.S. Appl. No. 14/883,894, filed Oct. 15, 2015.

GB Examination and Search Report for related application GB1619825.1 dated Oct. 11, 2017, 7 pp.

* cited by examiner

APPARATUS AND METHOD OF FORMING A COMPOSITE STRUCTURE

BACKGROUND

The field of the present disclosure relates generally to composite structures and, more specifically, to systems and methods of hot drape forming composite structures.

At least some known composite structures are formed using a process known as hot drape forming. Hot drape forming typically includes heating one or more plies of flat pre-impregnated (i.e., prepreg) composite material, and forcing the composite material around a mandrel with a vacuum bag or a pressurized bladder device. Composite structures, such as composite charges, are formed from one or more plies of composite material. Forcing the composite material around the mandrel facilitates forming composite parts for use in the aerospace industry, for example. More specifically, at least some known composite parts include a body portion and a flange portion that is formed when forced around the mandrel. However, uncontrolled compression of the composite material when forced around the mandrel can result in buckling or wrinkling of the plies within a composite part.

BRIEF DESCRIPTION

In one aspect, a drape forming apparatus for use in forming a composite structure is provided. The apparatus includes a forming tool including an upper forming surface and at least one side forming surface that extends from the upper forming surface. The forming tool is configured to receive at least one layer of composite material extending over the upper forming surface. The apparatus further includes a flange forming device including an upper plate, a lower plate, and a receiving slot defined between the upper plate and the lower plate. The receiving slot for receiving a flange portion of the at least one layer of composite material, and wherein the flange forming device is translatable relative to the forming tool such that the flange portion of the at least one layer of composite material is withdrawn from the receiving slot and draped over the at least one side forming surface. The apparatus further includes a pressurized bladder configured to extend over the forming tool and the upper plate of the flange forming device. The pressurized bladder is configured to force the flange portion against the at least one side forming surface as the flange forming device translates relative to the forming tool.

In another aspect, a flange forming device for use in forming a composite structure from at least one layer of composite material is provided. The device includes an upper plate, and a lower plate hingeably coupled with the upper plate. A receiving slot is defined between the upper plate and the lower plate for receiving a flange portion of the at least one layer of composite material. The device further includes a biasing device extending from the upper plate. The biasing device is configured to bias towards the lower plate and against the flange portion with a predetermined retaining force.

In yet another aspect, a method of forming a composite structure is provided. The method includes extending at least one layer of composite material over an upper forming surface of a forming tool, positioning a flange portion of the at least one layer of composite material within a receiving slot defined between an upper plate and a lower plate of a flange forming device, extending a pressurized bladder over the forming tool and the upper plate of the flange forming device, and translating the flange forming device relative to the forming tool such that the flange portion of the at least one layer of composite material is withdrawn from the receiving slot and draped over at least one side forming surface of the forming tool. The pressurized bladder is configured to force the flange portion against the at least one side forming surface as the flange forming device translates relative to the forming tool.

DETAILED DESCRIPTION

The implementations described herein relate to systems and methods of forming a composite structure having a flange. More specifically, the systems and methods described herein include a flange forming device that, when used in combination with a pressurized bladder, facilitates controlling the pressure induced to at least one layer of composite material used to form the composite structure. For example, the rate of translation of the forming device relative to a forming tool is selected to ensure a more uniform and controlled pressure is induced to a flange portion of at least one layer of composite material when formed around the forming tool. As such, the systems and methods described herein facilitate forming composite structures in a more reliable, easier, and defect reducing manner.

Figure 1:
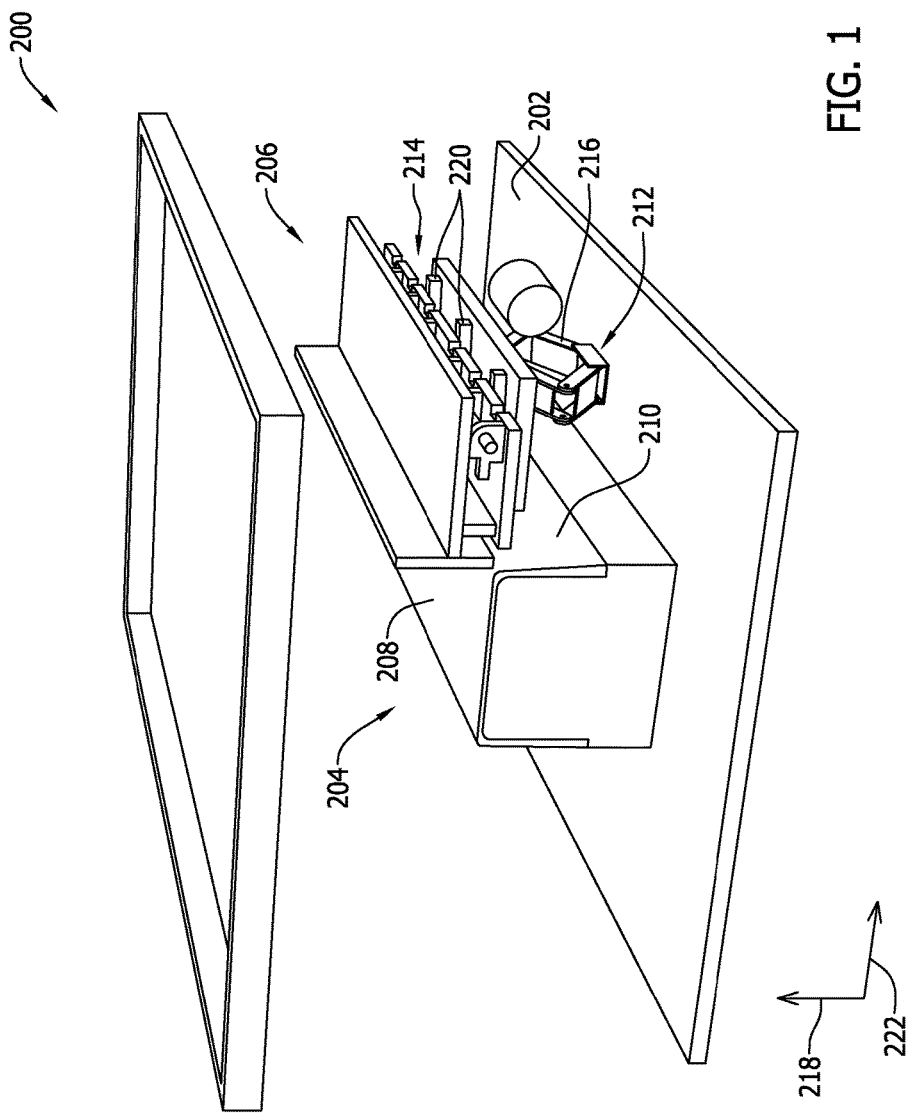
FIG. 1 is a perspective view of an exemplary drape forming apparatus.

FIG. 1 is a perspective view of an exemplary drape forming apparatus 200. In the exemplary implementation, drape forming apparatus 200 includes a base 202, a forming tool 204, and a flange forming device 206. Forming tool 204 and flange forming device 206 are coupled to base 202. Forming tool 204 includes an upper forming surface 208 and at least one side forming surface 210 that extends substantially perpendicularly from upper forming surface 208. As will be described in more detail below, forming tool 204 receives at least one layer (not shown in FIG. 1) of composite material for forming a composite structure, having a flange, on forming tool 204 in-situ. In an alternative implementation, side forming surface 210 has any contour and extends from upper forming surface 208 in any orientation that enables drape forming apparatus 200 to function as described herein.

At least one layer of composite material is also received within flange forming device 206, and flange forming device 206 is translatable relative to forming tool 204 such that a flange portion of at least one layer of composite material is withdrawn from flange forming device 206 and draped over at least one side forming surface 210. More specifically, drape forming apparatus 200 further includes a first actuator 212 coupled between base 202 and flange forming device 206, and a second actuator 214 coupled between base 202 and flange forming device 206. First actuator 212 is embodied as a vertical actuator device 216 for selectively translating flange forming device 206 along a first axis 218. Moreover, second actuator 214 is embodied as a slide track device 220 for selectively translating flange forming device 206 along a second axis 222 oriented obliquely relative to first axis 218. As such, as will be described in more detail below, first actuator 212 selectively translates flange forming device 206 relative to forming tool 204 along the at least one side forming surface 210, and second actuator 214 selectively translates flange forming device 206 one of towards or away from the at least one side forming surface 210 to facilitate forming the flange portion of the composite structure in a controlled manner. In an alternative implementation, forming tool 204 is translatable relative to flange forming device 206.

Figure 2:
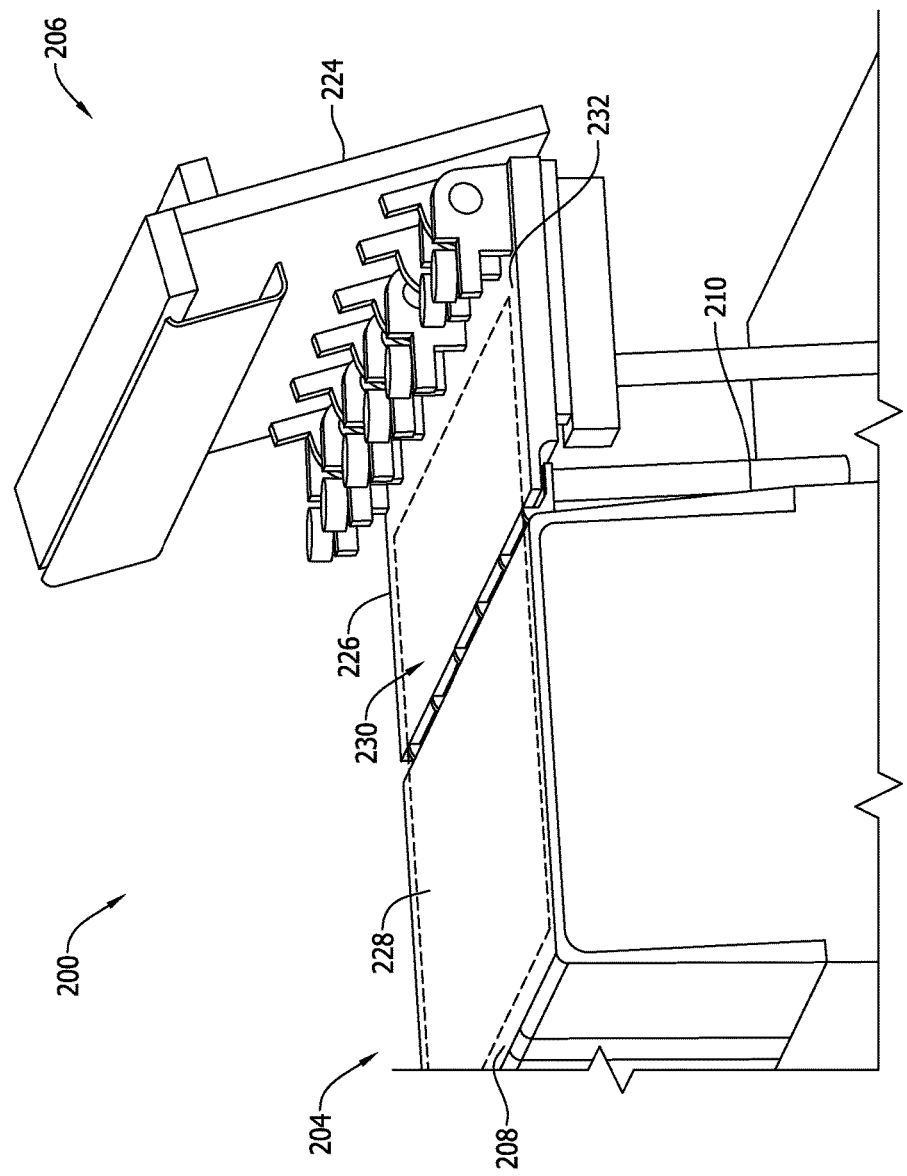
FIG. 2 is a perspective view of an exemplary flange forming device in an open position that may be used with the drape forming apparatus shown in FIG. 1.
Figure 3:
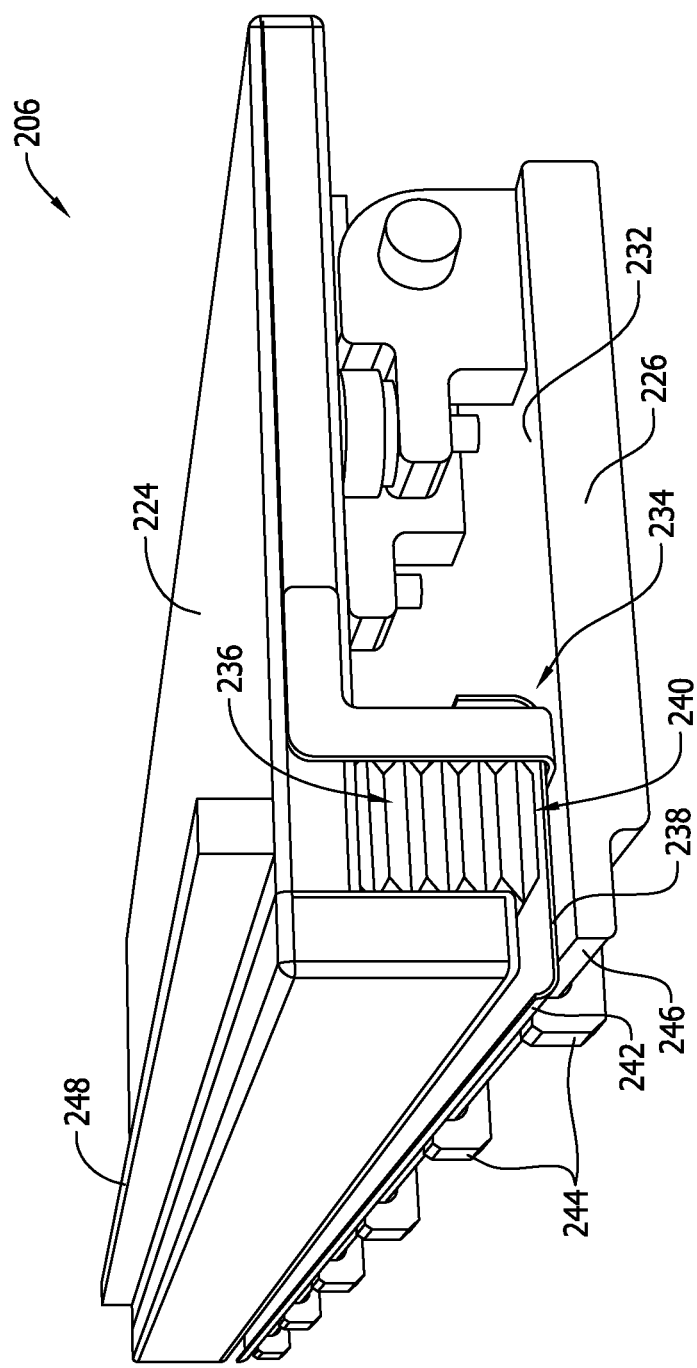
FIG. 3 is a perspective view of an exemplary flange forming device in a closed position that may be used with the drape forming apparatus shown in FIG. 1.

FIG. 2 is a perspective view of flange forming device 206 in an open position, and FIG. 3 is a perspective view of flange forming device 206 in a closed position. In the exemplary implementation, flange forming device 206 includes an upper plate 224 and a lower plate 226 hingeably coupled with upper plate 224. As such, upper plate 224 and lower plate 226 are movable relative to each other such that flange forming device 206 is selectively positioned between the open position and the closed position.

Referring to FIG. 2, flange forming device 206 is in the open position, and forming tool 204 receives at least one layer 228 of composite material extending over upper forming surface 208. The at least one layer 228 of composite material is also loaded into flange forming device 206. More specifically, a flange portion 230 of at least one layer 228 extends past upper forming surface 208 and onto an upper surface 232 of lower plate 226. As such, lower plate 226 supports flange portion 230 as flange portion 230 is forced around forming tool 204 during the flange forming process, which facilitates reducing the formation of buckling or wrinkles from forming within the composite structure.

Referring to FIG. 3, upper plate 224 is moved relative to lower plate 226 such that flange forming device 206 is in the closed position. When in the closed position, a receiving slot 234 is defined between upper plate 224 and lower plate 226 for receiving flange portion 230 (shown in FIG. 2) of at least one layer 228 (shown in FIG. 2) of composite material. More specifically, flange forming device 206 includes a biasing device 236 extending from upper plate 224, and a compression plate 238 coupled at a free end 240 of biasing device 236 such that receiving slot 234 is defined between compression plate 238 and lower plate 226.

In operation, biasing device 236 biases towards lower plate 226 and biases against flange portion 230 with a predetermined retaining force. Moreover, as described above, flange forming device 206 is selectively translated relative to forming tool 204 (shown in FIG. 2) during the flange forming process. The predetermined retaining force is less than an amount of force capable of retaining flange portion 230 within receiving slot 234 as the height of flange forming device 206 is reduced relative to a floor (not shown) when translated along first axis 218. However, the predetermined retaining force is selected to facilitate tensioning flange portion 230 as flange forming device 206 translates relative to forming tool 204 and as flange portion 230 is withdrawn from receiving slot 234. As such, the formation of wrinkles within flange portion 230 is reduced.

Moreover, in the exemplary implementation, compression plate 238 has a contoured side edge 242 positioned proximate to forming tool 204. Contoured side edge 242 is oriented in an upward direction towards upper plate 224. As such, contoured side edge 242 facilitates reducing stress concentrations in flange portion 230 as flange portion 230 is withdrawn past contoured side edge 242.

In some implementations, flange forming device 206 further includes at least one slide bumper 244 that extends from a side edge 246 of lower plate 226, and an elongated member 248 that extends from upper plate 224. Slide bumper 244 guides flange forming device 206 along the at least one side forming surface 210 (shown in FIG. 1) as flange forming device 206 translates relative thereto. As such, the at least one slide bumper 244 guides flange forming device 206 relative to forming tool 204 as the contour of side forming surface 210 changes. Moreover, as will be described in more detail below, elongated member 248 is oriented to pre-stretch a portion of a pressurized bladder 250 (shown in FIGS. 4-6) extending over upper plate 224.

Figure 4:
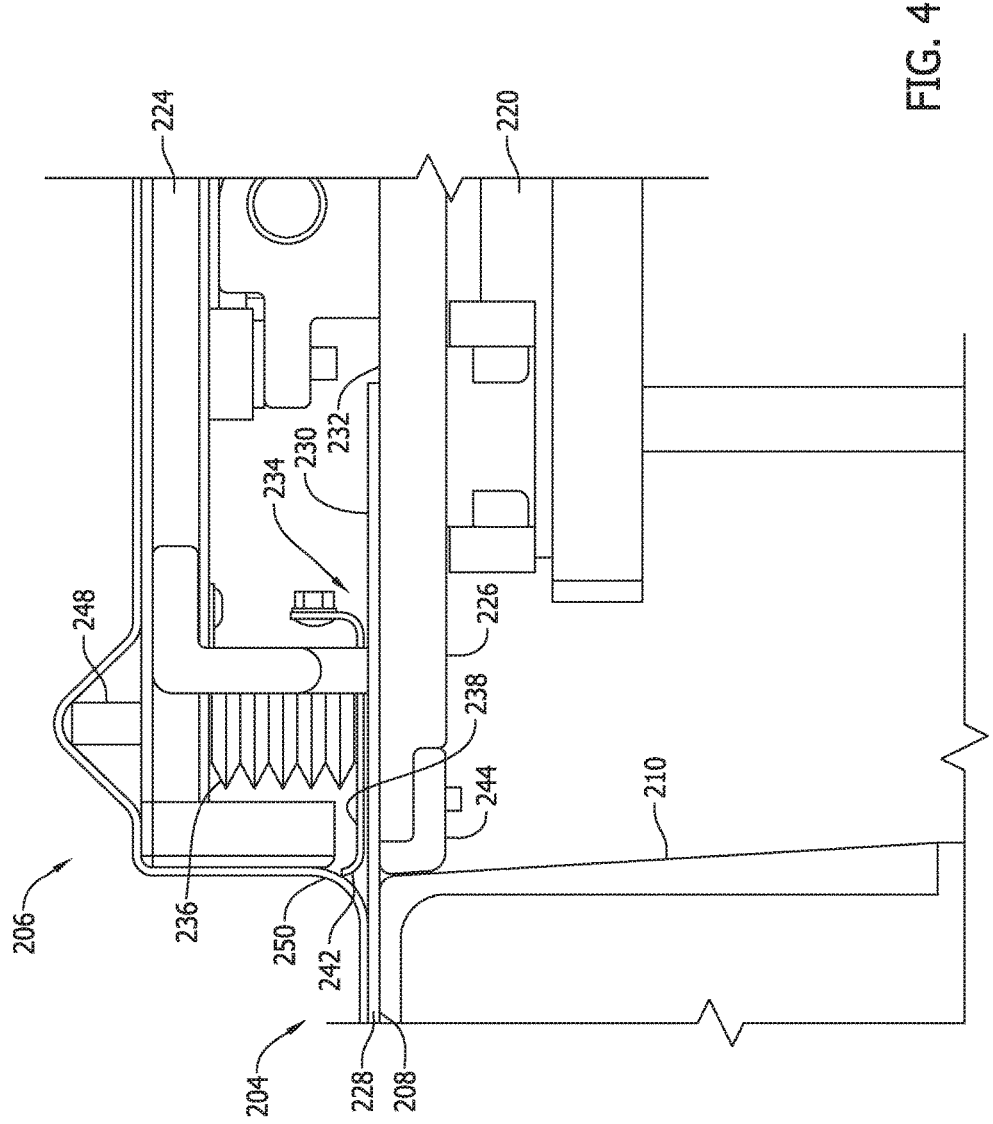
FIG. 4 is a side view of the drape forming apparatus shown in FIG. 1 in a first flange forming position.
Figure 5:
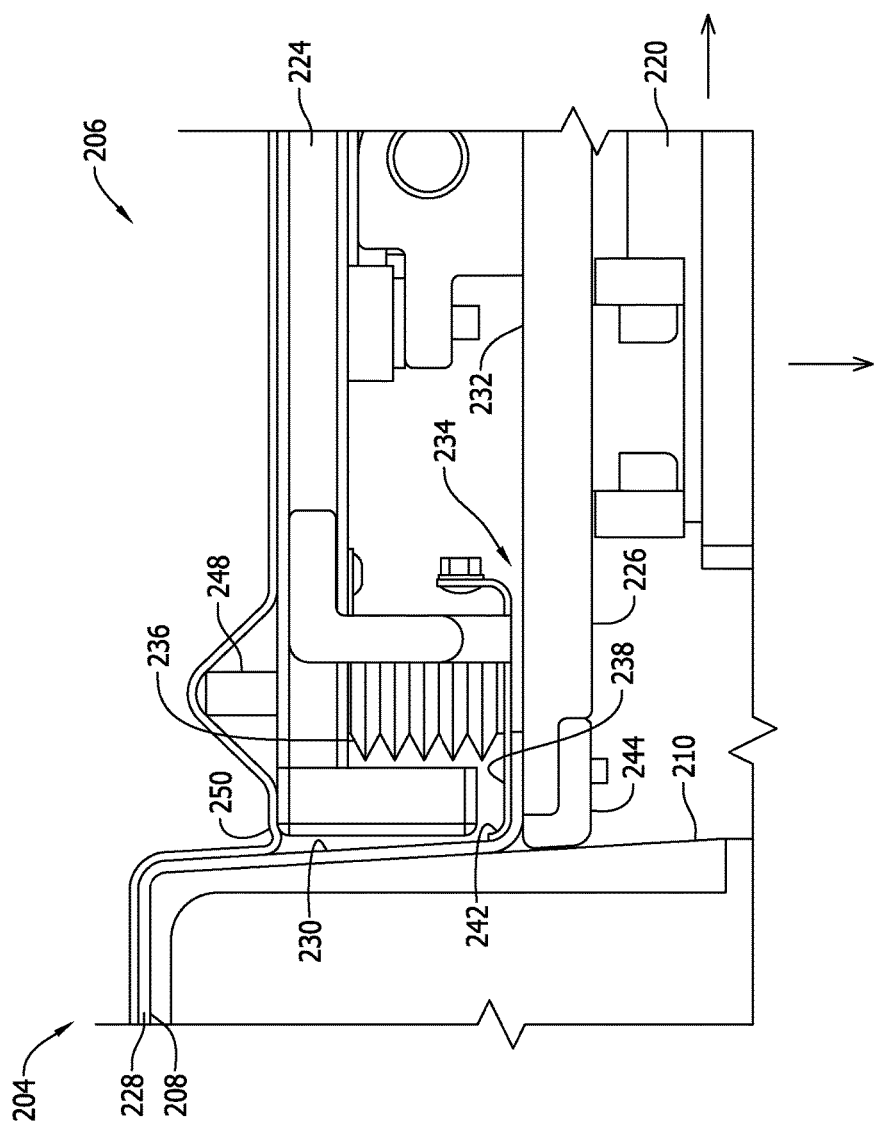
FIG. 5 is a side view of the drape forming apparatus shown in FIG. 1 in a second flange forming position.
Figure 6:
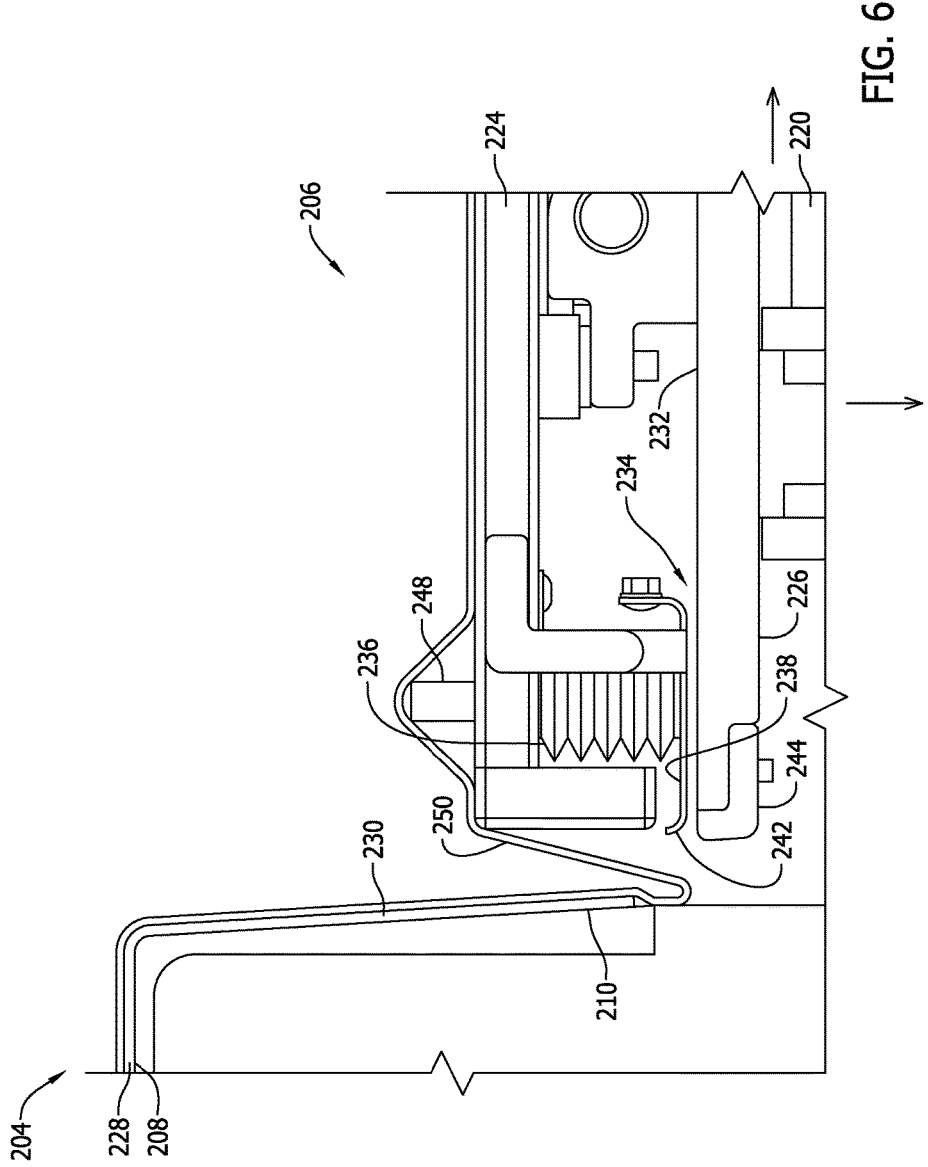
FIG. 6 is a side view of the drape forming apparatus shown in FIG. 1 in a third flange forming position.

FIG. 4 is a side view of the drape forming apparatus 200 in a first flange forming position, FIG. 5 is a side view of drape forming apparatus 200 in a second flange forming position, and FIG. 6 is a side view of drape forming apparatus 200 in a third flange forming position. Referring to FIG. 4, the first flange forming position is embodied as a starting position for flange forming device 206 relative to forming tool 204 in the flange forming process. More specifically, when at the starting position, upper forming surface 208 and upper surface 232 of lower plate 226 substantially align, and at least one layer 228 of composite material is received on forming tool 204 and loaded within flange forming device 206, as described above. At least one layer 228 is then heated, when embodied as prepreg, to facilitate softening the matrix material embedded therein. In one implementation, a heat blanket (not shown) covering at least one layer 228 is used to soften the matrix material. Alternatively, heat lamps (not shown) may be used to heat the at least one layer 228.

A pressurized bladder 250 is then extended over forming tool 204 and upper plate 224 of flange forming device 206. In the exemplary implementation, pressurized bladder 250 is fabricated from an elastically deformable material, and is pressurized to bias at least one layer 228 against upper forming surface 208 and side forming surface 210. More specifically, pressurized bladder 250 forces flange portion 230 against side forming surface 210 as flange forming device translates relative to forming tool 204.

Referring to FIG. 5, the height of flange forming device 206 is reduced as flange forming device 206 translates relative to forming tool 204. Reducing the height of flange forming device 206 facilitates withdrawing flange portion 230 from receiving slot 234. Moreover, the rate of translation of flange forming device 206 relative to forming tool 204 is controlled to ensure flange portion 230 is substantially wrinkle free prior to being covered by pressurized bladder 250. More specifically, pressurized bladder 250 progressively covers flange portion 230 as flange portion 230 is withdrawn from receiving slot 234. As such, pressure is gradually applied to flange portion 230 to facilitate reducing wrinkle formation therein. Further, elongated member 248 pre-stretches pressurized bladder 250 to ensure pressurized bladder 250 does not prematurely force flange portion 230 against side forming surface 210.

Referring to FIG. 6, flange portion 230 is completely withdrawn from receiving slot 234 and pressurized bladder 250 is completely covering flange portion 230 on forming tool 204. As such, pressurized bladder 250 applies a substantially uniform pressure across the at least one layer 228 and holds layer 228 in place on forming tool 204 as the temperature of the at least one layer 228 is reduced, thereby forming the composite structure.

Figure 7:
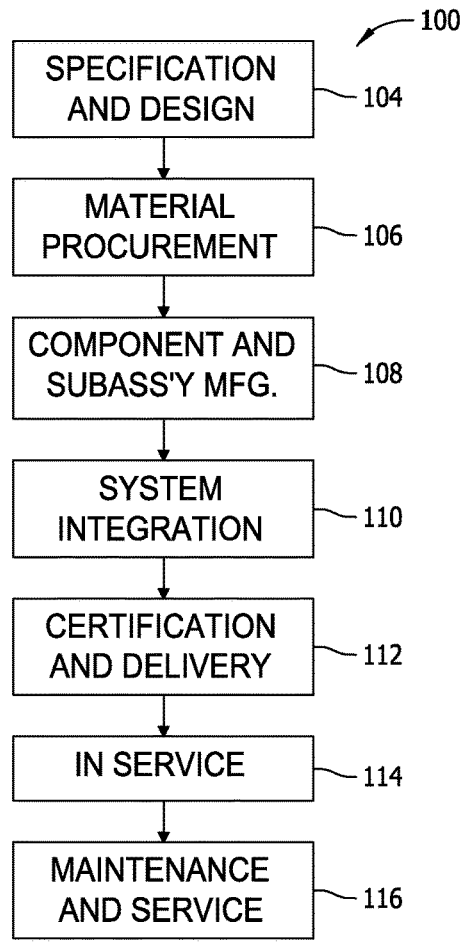
FIG. 7 is a flow diagram of an exemplary aircraft production and service method.
Figure 8:
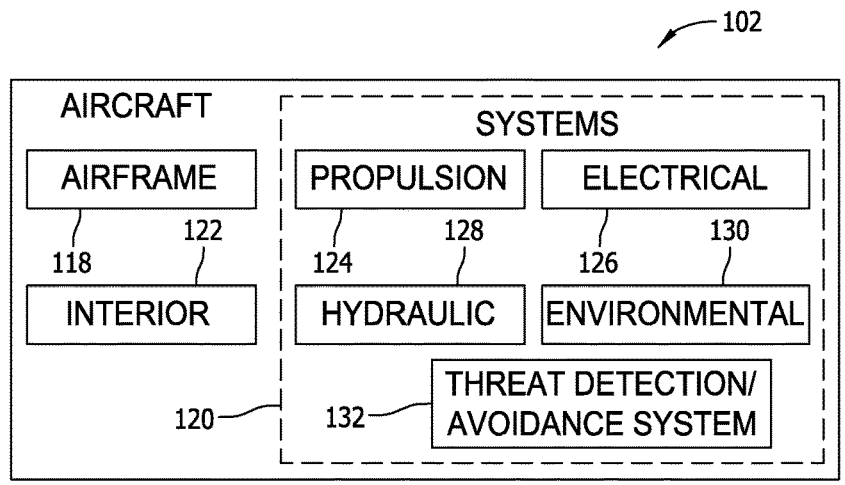
FIG. 8 is a block diagram of an exemplary aircraft.

Implementations of the disclosure may be described in the context of an aircraft manufacturing and service method 100 (shown in FIG. 7) and via an aircraft 102 (shown in FIG. 8). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented on platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, aircraft 102 produced via method 100 may include an airframe 118 having a plurality of systems 120 and an interior 122. Examples of high-level systems 120 include one or more of a propulsion system 124, an electrical system 126, a hydraulic system 128, an environmental system 130, and/or a threat detection/avoidance system 132. Threat detection/avoidance system 132 may be embodied as one or more sensors for detecting a threat received at aircraft 102, and a computing device for analyzing the threat and determining avoidance techniques for aircraft 102, as will be described in more detail below. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Moreover, it should be understood that, although an aerospace example is shown, the principles of the disclosure may be applied to other structures, such as a maritime structure or an automotive structure.

A method of forming a composite structure is also described herein. The method includes extending at least one layer 228 of composite material over upper forming surface 208 of forming tool 204, positioning flange portion 230 of at least one layer 228 of composite material within receiving slot 234 defined between upper plate 224 and lower plate 226 of flange forming device 206, and extending pressurized bladder 250 over forming tool 204 and upper plate 224 of flange forming device 206. Flange forming device 206 is translated relative to forming tool 204 such that flange portion 230 of at least one layer 228 of composite material is withdrawn from receiving slot 234 and draped over at least one side forming surface 210 of forming tool 204. The pressurized bladder 250 is configured to force flange portion 230 against at least one side forming surface 210 as flange forming device 206 translates relative to forming tool 204.

In one implementation, translating flange forming device 206 includes controlling the rate of translation of flange forming device 206 relative to forming tool 204. The method also includes progressively covering flange portion 230 of at least one layer 228 of composite material with pressurized bladder 250 as flange portion 230 is withdrawn from receiving slot 234. The method further includes positioning flange forming device 206 at a starting position relative to forming tool 204 such that upper forming surface 208 and upper surface 232 of lower plate 226 substantially align.

In some implementations, the method includes holding flange portion 230 between upper plate 224 and lower plate 226 with a predetermined retaining force, and tensioning flange portion 230 as flange forming device 206 translates relative to forming tool 204. The tensioning is based at least partially on the predetermined retaining force. Further, the method includes pre-stretching a portion of pressurized bladder 250 prior to the portion forcing flange portion 230 against at least one side forming surface 210. The method further includes heating at least one layer 228 of composite material as at least one layer 228 is forced against forming tool 204.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drape forming apparatus for use in forming a composite structure, said apparatus comprising:
   a forming tool comprising an upper forming surface and at least one side forming surface that extends from said upper forming surface, said forming tool configured to receive at least one layer of composite material extending over said upper forming surface;
   a flange forming device comprising an upper plate, a lower plate, a biasing device extending from said upper plate, a compression plate coupled at a free end of said biasing device, and a receiving slot defined between said compression plate and said lower plate, said receiving slot for receiving a flange portion of the at least one layer of composite material, wherein said flange forming device is translatable relative to said forming tool, wherein said upper plate and said lower plate are hingeably coupled, and rotatable relative, to each other such that said flange forming device is selectively positioned between an open position and a closed position, and wherein said biasing device is configured to bias said compression plate towards said lower plate and bias against the flange portion with a predetermined retaining force that enables the flange portion of the at least one layer of composite material to be withdrawn from said receiving slot and draped over said at least one side forming surface when the forming device is in the closed portion and translates relative to said forming tool; and a pressurized bladder configured to extend over said forming tool and said upper plate of said flange forming device, said pressurized bladder configured to force the flange portion against said at least one side forming surface as said flange forming device translates relative to said forming tool.

2. The apparatus in accordance with claim 1, wherein said flange forming device further comprises a slide bumper that extends from a side edge of said lower plate, the slide bumper configured to guide said flange forming device along said at least one side forming surface as said flange forming device translates relative to the at least one side forming surface.

3. The apparatus in accordance with claim 1, wherein said flange forming device further comprises an elongated member extending from said upper plate, said elongated member oriented to pre-stretch a portion of said pressurized bladder prior to said portion forcing the flange portion against said at least one side forming surface.

4. The apparatus in accordance with claim 1 further comprising:
a base;
a first actuator coupled between said base and said flange forming device, said first actuator configured to selectively translate said flange forming device relative to said forming tool along said at least one side forming surface; and
a second actuator coupled between said base and said flange forming device, said second actuator configured to selectively translate said flange forming device one of towards or away from said at least one side forming surface.

5. A flange forming device for use in forming a composite structure from at least one layer of composite material, said device comprising:
an upper plate;
a lower plate;
a biasing device extending from said upper plate;
a compression plate coupled at a free end of said biasing device; and
a receiving slot defined between said compression plate and said lower plate, said receiving slot for receiving a flange portion of the at least one layer of composite material;
wherein said upper plate and said lower plate are hingeably coupled, and rotatable relative, to each other such that said flange forming device is selectively positioned between an open position and a closed position; and
wherein said biasing device is configured to bias said compression plate towards said lower plate and bias against the flange portion with a predetermined retaining force that enables the flange portion of the at least one layer of composite material to be withdrawn from said receiving slot when the forming device is in the closed portion and translates relative to a forming tool.

6. The device in accordance with claim 5, wherein said flange forming device further comprises a slide bumper that extends from a side edge of said lower plate.

7. The device in accordance with claim 5, wherein said flange forming device further comprises an elongated member extending from said upper plate, said elongated member oriented substantially vertically relative to said upper plate.

8. The device in accordance with claim 5 further comprising:
a base;
a first actuator coupled between said base and said flange forming device, said first actuator configured to selectively translate said flange forming device along a first axis; and
a second actuator coupled between said base and said flange forming device, said second actuator configured to selectively translate said flange forming device along a second axis oriented obliquely relative to the first axis.

9. A method of forming a composite structure, said method comprising:
providing a forming tool comprising an upper forming surface and at least one side forming surface that extends from said upper forming surface;
providing a flange forming device comprising an upper plate, a lower plate hingeably coupled to the upper plate, a biasing device extending from said upper plate, a compression plate coupled at a free end of said biasing device, and a receiving slot defined between said compression plate and said lower plate;
extending at least one layer of composite material over the upper forming surface of the forming tool;
positioning a flange portion of the at least one layer of composite material within the receiving slot;
rotating the upper plate towards the lower plate such that said flange forming device moves from an open position to a closed position;
biasing the compression plate towards said lower plate using the biasing device to retain the flange portion in the receiving slot with a predetermined retaining force,
extending a pressurized bladder over the forming tool and the upper plate of the flange forming device; and
translating the flange forming device relative to the forming tool such that the flange portion of the at least one layer of composite material is withdrawn from the receiving slot and draped over said at least one side forming surface of the forming tool, wherein the pressurized bladder is configured to force the flange portion against the at least one side forming surface as the flange forming device translates relative to the forming tool.

10. The method in accordance with claim 9, wherein translating the flange forming device comprises controlling the rate of translation of the flange forming device relative to the forming tool.

11. The method in accordance with claim 9 further comprising progressively covering the flange portion of the at least one layer of composite material with the pressurized bladder as the flange portion is withdrawn from the receiving slot.

12. The method in accordance with claim 9 further comprising positioning the flange forming device at a starting position relative to the forming tool such that the upper forming surface and an upper surface of the lower plate substantially align.

13. The method in accordance with claim 9 further comprising: tensioning the flange portion as the flange forming device translates relative to the forming tool, the tensioning based at least partially on the predetermined retaining force.

14. The method in accordance with claim 9 further comprising pre-stretching a portion of the pressurized bladder prior to the portion forcing the flange portion against the at least one side forming surface.

15. The method in accordance with claim 9 further comprising heating the at least one layer of composite material as the at least one layer is forced against the forming tool.

* * * * *

UNITED STATES PATENT AND TRADEMARK OFFICE
CERTIFICATE OF CORRECTION

PATENT NO. : 10,239,251 B2
APPLICATION NO. : 15/004610
DATED : March 26, 2019
INVENTOR(S) : Deck et al.

Page 1 of 1

It is certified that error appears in the above-identified patent and that said Letters Patent is hereby corrected as shown below:

In the Claims

In Column 7, Line 14, Claim 1, delete "closed portion" and insert therefor -- closed position --.

In Column 8, Line 3, Claim 5, delete "closed portion" and insert therefor -- closed position --.

In Column 8, Line 45, Claim 9, delete "force," and insert therefor -- force; --.

Signed and Sealed this
Twentieth Day of August, 2019

Andrei Iancu
*Director of the United States Patent and Trademark Office*